US012260848B2

(12) United States Patent
Wei et al.

(10) Patent No.: US 12,260,848 B2
(45) Date of Patent: Mar. 25, 2025

(54) METHOD FOR GENERATING ACTIVE NOISE REDUCTION FILTER, STORAGE MEDIUM AND EARPHONE

(71) Applicant: Shenzhen Bluetrum Technology Co., Ltd., Guangdong (CN)

(72) Inventors: Shali Wei, Guangdong (CN); Chongming Xu, Guangdong (CN); Xiangen Deng, Guangdong (CN)

(73) Assignee: Shenzhen Bluetrum Technology Co., Ltd., Shenzhen (CN)

( * ) Notice: Subject to any disclaimer, the term of this patent is extended or adjusted under 35 U.S.C. 154(b) by 314 days.

(21) Appl. No.: 17/956,845

(22) Filed: Sep. 30, 2022

(65) Prior Publication Data

US 2023/0131827 A1 Apr. 27, 2023

(30) Foreign Application Priority Data

Oct. 21, 2021 (CN) ........................ 202111225489.9

(51) Int. Cl.

*G10K 11/00* (2006.01)
*G10K 11/178* (2006.01)
*H04R 1/10* (2006.01)

(52) U.S. Cl.

CPC .. *G10K 11/17815* (2018.01); *G10K 11/17823* (2018.01); *G10K 11/17825* (2018.01); *G10K 11/17881* (2018.01); *H04R 1/1083* (2013.01); *G10K 2210/1081* (2013.01); *G10K 2210/3022* (2013.01); *G10K 2210/3026* (2013.01); *G10K 2210/3027* (2013.01);

(Continued)

(58) Field of Classification Search

CPC ....... G10K 11/17815; G10K 11/17823; G10K 11/17825; G10K 11/17881; G10K 2210/1081; G10K 2210/3022; G10K 2210/3026; G10K 2210/3027; G10K 2210/3028; G10K 2210/3055; H04R 1/1083; H04R 2460/01

USPC .................................... 381/71.1, 71.11, 71.6

See application file for complete search history.

(56) References Cited

U.S. PATENT DOCUMENTS 8,903,101 B2 12/2014 Christoph et al.
9,082,389 B2 7/2015 Nicholson et al.

(Continued)

FOREIGN PATENT DOCUMENTS

CN 110402540 A 11/2019
CN 110706686 A 1/2020

(Continued)

*Primary Examiner* — William A Jerez Lora

(57) ABSTRACT

A method for generating an active noise reduction filter includes: obtaining a physically noise-reduced signal, the physically noise-reduced signal being a signal received by a feedback microphone after a noise signal passes through an earphone, obtaining a mixed signal, the mixed signal being a signal received by the feedback microphone when the same noise signal is played and the earphone plays a through signal in a through state, calculating an input signal according to the mixed signal and the physically noise-reduced signal, performing adaptive filtering on the input signal and the physically noise-reduced signal according to an adaptive filtering algorithm to obtain a transfer function, and generating an active noise reduction filter according to the transfer function.

20 Claims, 7 Drawing Sheets

(52) U.S. Cl.
CPC ................ *G10K 2210/3028* (2013.01); *G10K 2210/3055* (2013.01); *H04R 2460/01* (2013.01)

(56) References Cited

U.S. PATENT DOCUMENTS

| | | | | |
|---|---|---|---|---|
| 11,640,817 | B2 * | 5/2023 | Barnes ............. | G10K 11/17823 381/71.6 |
| 2012/0170766 | A1 * | 7/2012 | Alves ................... | H04R 1/1083 381/71.11 |
| 2014/0126733 | A1 * | 5/2014 | Gauger, Jr. ........ | G10K 11/1783 381/71.6 |

FOREIGN PATENT DOCUMENTS

| | | | | | |
|---|---|---|---|---|---|
| CN | 112289295 | A | | 1/2021 | |
| CN | 112562625 | A | | 3/2021 | |
| CN | 113421540 | A | | 9/2021 | |
| CN | 113676815 | A | * | 11/2021 | |
| JP | 2009086988 | A | | 4/2009 | |
| JP | 2015165325 | A | | 9/2015 | |
| KR | 1020140139053 | A | | 12/2014 | |
| WO | 2021114514 | A1 | | 6/2021 | |
| WO | 2021204754 | A1 | | 10/2021 | |
| WO | WO-2024054487 | A1 | * | 3/2024 | ....... G10K 11/17823 |

* cited by examiner

METHOD FOR GENERATING ACTIVE NOISE REDUCTION FILTER, STORAGE MEDIUM AND EARPHONE

CROSS-REFERENCE TO RELATED APPLICATIONS

The present disclosure claims priority of Chinese Patent Application No. 202111225489.9, filed on Oct. 21, 2021, titled "method for generating active noise reduction filter, storage medium and earphone", the contents of which are incorporated herein by reference.

TECHNICAL FIELD

The present disclosure relates to the technical field of active noise reduction, and in particular, relates to a method for generating an active noise reduction filter, a storage medium and an earphone.

BACKGROUND

Active noise reduction earphones can generate active noise reduction signals with equal amplitude and opposite phase to noise signals, so that the active noise reduction signals can cancel the noise signals, thereby achieving the purpose of noise reduction.

Referring to FIG. 1, the active noise reduction earphone includes two important acoustic paths, namely, a physical acoustic path P(z) from the noise source to the human ear (when the earphone is worn) and a playing acoustic path G(z) from the speaker of the earphone to the human ears. Here, in order to achieve active noise reduction, a noise reduction acoustic path of the active noise reduction filter is H(z). It is assumed that the transfer function of the acoustic path P(z) is H1, the transfer function of the noise reduction acoustic path H(z) is H2, and the transfer function of the acoustic path G(z) is H3. As can be known from FIG. 1, the relationships among the three transfer functions are: P(z)=H(z)*G(z).

If the noise signal is x(n), then the size of the noise after physical noise reduction that is heard after wearing the earphone is d(n)=x(n)*p(n), wherein p(n) is the time domain expression of P(z).

After the noise reduction function of the active noise reduction earphone is turned on, the residual noise signal e(n) heard by human ears is as shown in the following equation, and the residual noise should be 0 under ideal conditions, i.e., $$e(n) = y_2(n) - d(n) = y_1(n) * g(n) - x(n) * p(n) = x(n) * h(n) * g(n) - x(n) * p(n) = 0$$

wherein g(n) is the time domain expression of G(z).

In order to obtain the transfer function H2 of the noise reduction acoustic path H(z), the common practice is to obtain the transfer function H1 and the transfer function H3 respectively, and then obtain the transfer function H2 according to the transfer function H1 and the transfer function H3. This practice needs to obtain the transfer function H1 and the transfer function H3 first, but it is relatively difficult to obtain the accurate P(z) and G(z), because P(z) is related to the directivity, the location of the sound box as a sound source and the type of the sound source. G(z) also varies from person to person. G(z) varies due to different external factors such as the way one wear the earphone and the shape of the auricles. Therefore, it is relatively difficult to obtain accurate P(z) and G(z), and two errors will be introduced when measuring the transmission paths of P(z) and G(z). Finally, when estimating the transfer function H2, the superposition effect of errors for P(z) and G(z) will greatly increase the error of estimating the transfer function H2.

SUMMARY

An embodiment of the present disclosure provides a method for generating active noise reduction filter. The method includes: obtaining a physically noise-reduced signal, the physically noise-reduced signal being a signal received by a feedback microphone after a noise signal passes through an earphone, obtaining a mixed signal, the mixed signal being a signal received by the feedback microphone when the same noise signal is played and the earphone plays a through signal in a through state, calculating an input signal according to the mixed signal and the physically noise-reduced signal, performing adaptive filtering on the input signal and the physically noise-reduced signal according to an adaptive filtering algorithm to obtain a transfer function, and generating an active noise reduction filter according to the transfer function.

BRIEF DESCRIPTION OF THE DRAWINGS

One or more embodiments are illustrated by pictures in corresponding attached drawings, and this does not constitute limitation of the embodiments. Elements labeled with the same reference numerals in the attached drawings represent similar elements, and unless otherwise stated, figures in the attached drawings do not constitute scale limitation.

DETAILED DESCRIPTION

In order to make objects, technical solutions and advantages of the present disclosure clearer, the present disclosure will be further described in detail with reference to attached drawings and embodiments. It shall be appreciated that, the specific embodiments described herein are only used to explain the present disclosure, and are not used to limit the present disclosure. Based on the embodiments of the present disclosure, all other embodiments obtained by those of ordinary skill in the art without creative labor belong to the scope claimed in the present disclosure.

It shall be noted that, all features in the embodiments of the present disclosure can be combined with each other if there is no conflict, and all the combination are within the scope claimed in the present disclosure. In addition, although functional modules are divided in the schematic diagrams of the device and logical sequences are shown in the flowchart diagrams, in some cases, the steps shown or described can be performed in module division and sequences different from those in the schematic diagrams and flowchart diagrams. Furthermore, words such as "first", "second" and "third" used in the present disclosure do not limit the data and execution order, but only distinguish same or similar items with basically the same functions and effects.

Figure 1:
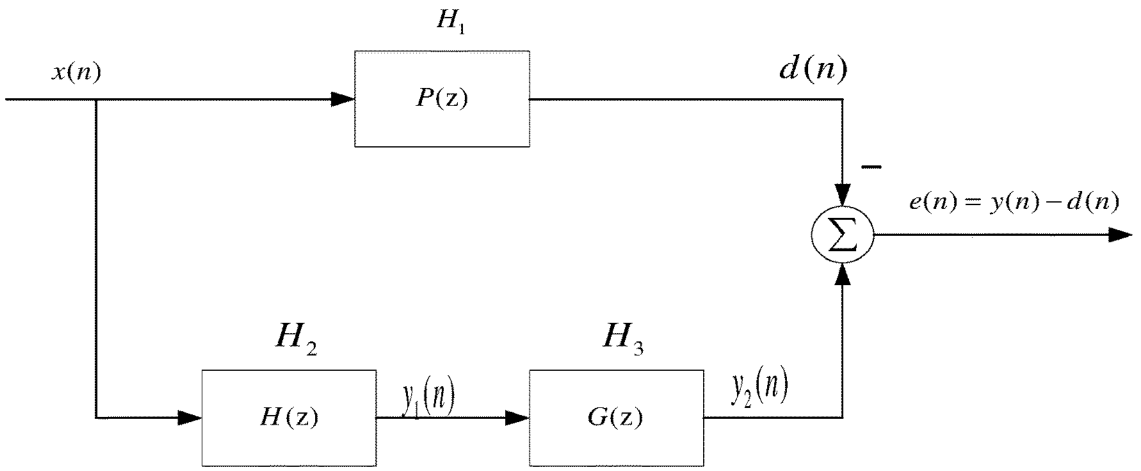
FIG. 1 is an architectural diagram of an acoustic path provided by the prior art.
Figure 2:
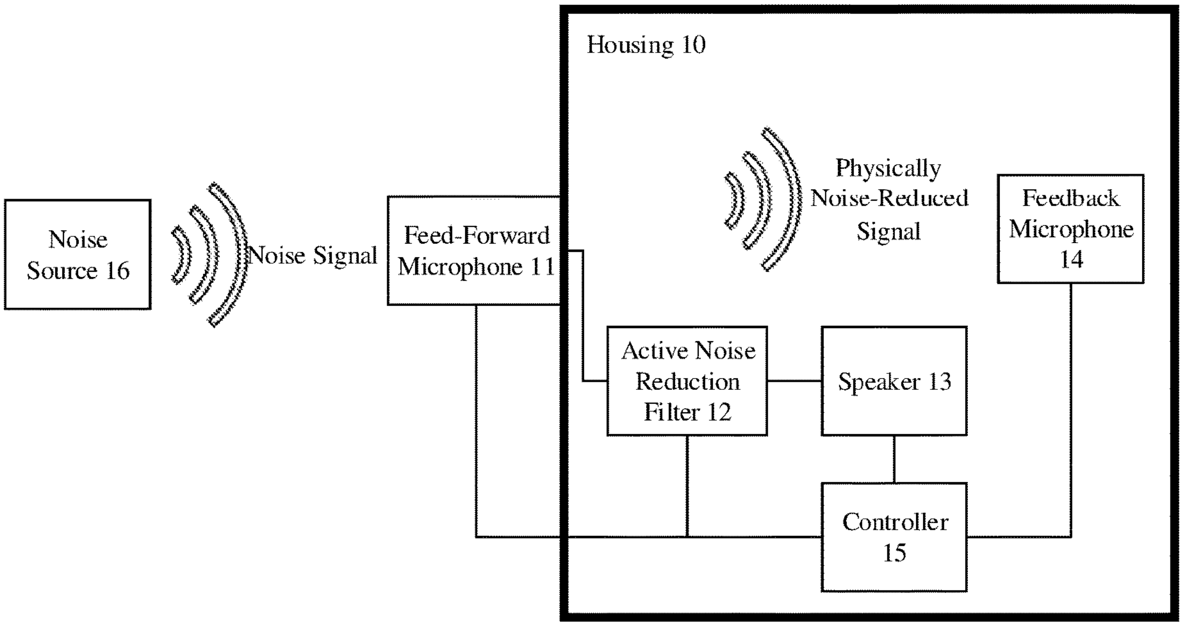
FIG. 2 is a schematic structural diagram of an earphone provided according to an embodiment of the present disclosure.

An embodiment of the present disclosure provides an earphone. Referring to FIG. 2, an earphone 100 includes a housing 10 and a feed-forward microphone 11, an active noise reduction filter 12, a speaker 13, a feedback microphone 14 and a controller 15 which are mounted on the housing 10.

The feed-forward microphone 11 is installed outside the housing 10, and is used to sample the noise signal played by a noise source 16. The noise signal is received by the feedback microphone 14 after passing through the housing 10. The noise source 16 may be any form of noise sources, such as a sound box or the like. The noise signal may be any suitable form of noise, such as sweep frequency noise or pink noise or the like.

It shall be appreciated that, the signal obtained after the noise signal passes through the housing 10 is sampled by the feedback microphone 14, and this signal may be regarded as the signal after physical noise reduction, that is, the physically noise-reduced signal.

The active noise reduction filter 12 is controlled by the controller 15 to generate an active noise reduction signal through the speaker 13. The controller 15 controls the working state of the active noise reduction filter 12 according to the noise signal sampled by the feed-forward microphone 11. For example, when the noise signal is sampled by the feed-forward microphone 11, the controller 15 may start the active noise reduction function of the active noise reduction filter 12, and when no noise signal is sampled by the feed-forward microphone 11, the controller 15 may turn off the active noise reduction function of the active noise reduction filter 12.

The speaker 13 is used to play the active noise reduction signal, which is equal in amplitude and opposite in phase to the noise signal under ideal conditions. When the active noise reduction function of the active noise reduction filter 12 is turned off by the controller 15, the through signal may be directly transmitted to the outside through the speaker 13 without the active noise reduction processing of the active noise reduction filter 12. When the active noise reduction function of the active noise reduction filter 12 is started by the controller 15, the through signal is subjected to active noise reduction by the active noise reduction filter 12 to obtain an active noise reduction signal, and the active noise reduction signal is transmitted to the outside through the speaker 13.

It shall be appreciated that, the speaker 13 may introduce a transfer function. As mentioned above, in order to achieve the purpose of active noise reduction, the prior art needs to calculate this transfer function.

The feedback microphone 14 is used to sample the physically noise-reduced signal obtained after the noise signal passes through the housing 10, and/or to sample the active noise reduction signal played by the speaker 13.

The controller 15 is integrated with an adaptive noise reduction algorithm module, which may control the active noise reduction filter 12 to perform adaptive filtering and noise reduction according to the signals sampled by the feed-forward microphone 11 and/or the feedback microphone 14. For example, first the noise signal of the noise source 16 is received by the feedback microphone 14 after passing through the housing 10, that is, the feedback microphone 14 receives the physically noise-reduced signal, and the controller 15 records the physically noise-reduced signal.

Then, the controller 15 turns off the active noise reduction function of the active noise reduction filter 12, that is, the working state of the active noise reduction filter 12 is set to the through state. In the through state, the through signal generated by the controller 15 is directly transmitted to the speaker 13 through the active noise reduction filter 12 without any processing, and then transmitted to the outside through the speaker 13.

Then, the noise source 16 plays the same noise signal. When the feed-forward microphone 11 transmits the sampled noise signal to the controller 15, the controller 15 synchronously controls the active noise reduction filter 12 to send the through signal to the speaker 13 in the through state, and the speaker 13 plays the through signal. Therefore, the feedback microphone 14 receives the mixed signal obtained by mixing the through signal and the physically noise-reduced signal. That is, the mixed signal is obtained by superposition of the through signal and the physically noise-reduced signal, and the through signal may be the noise signal collected by the feed-forward microphone 11 or a randomly selected audio signal.

Figure 3:
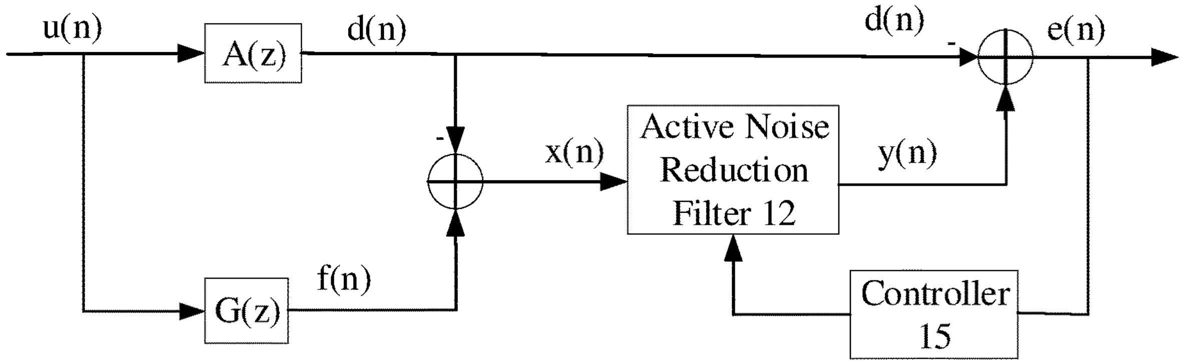
FIG. 3 is an architectural diagram of the acoustic path of the earphone shown in FIG. 2.

Referring to FIG. 3, A(z) is the acoustic path in which the noise signal u(n) is transmitted to the feedback microphone after passing through the housing 10, wherein A(z) may be the acoustic path of an unknown system. G(z) is the acoustic path in which the noise signal u(n) is collected by the feed-forward microphone 11 and then transmitted to the active noise reduction filter 12 and the speaker 13 in turn when the active noise reduction filter 12 is in the through state, and the noise signal u(n) may be used as the through signal.

At time t1, the controller 15 suspends the operation of the active noise reduction filter 12. After the noise signal u(n) passes through the acoustic path A(z), a physically noise-reduced signal d(n) may be obtained, and the physically noise-reduced signal d(n) may be received by the feedback microphone 14.

At time t2, the controller 15 sets the working state of the active noise reduction filter 12 to the through state, and controls the noise source 16 to play the same noise signal u(n) as that at time t1. The feed-forward microphone 11 samples the noise signal u(n), and after the sampled noise signal u(n) passes through the acoustic path G(z), a mixed signal f(n) may be obtained. That is, the sampled noise signal u(n) is input to the active noise reduction filter 12 as a through signal, and the active noise reduction filter 12 transmits the through signal to the speaker 13 in the through state, so that the speaker 13 outputs the through signal. Meanwhile, the mixed signal f(n) formed by the superposition of the through signal and the physically noise-reduced signal is sampled by the feedback microphone 14 and then the mixed signal f(n) is transmitted to the controller 15. The controller 15 subtracts the physically noise-reduced signal d(n) from the mixed signal f(n) to obtain an input signal x(n).

The controller 15 constructs an active noise reduction acoustic path B(z) for the active noise reduction filter 12, wherein the transfer function H0 of the active noise reduction acoustic path B(z) is calculated by the controller 15 according to the input signal x(n) and the physically noise-reduced signal d(n) and in combination with the adaptive filtering algorithm. Moreover, the controller 15 calculates digital filter parameters according to the transfer function H0, and fills the digital filter parameters into the active noise reduction filter 12. For example, the controller 15 obtains a reference output y(n) according to the input signal x(n) and in combination with the adaptive filtering algorithm, and subtracts the physically noise-reduced signal d(n) from the reference output y(n) to obtain an error e(n). The error e(n) is fed back to the adaptive filtering algorithm module of the controller 15, and the adaptive filtering algorithm module adjusts the transfer function H0 of the active noise reduction acoustic path B(z) again until the error e(n) is close to or equal to 0, and records the transfer function H0 at this time. Subsequently, in the application process, if a noise signal is encountered, the active noise reduction filter 12 may effectively and actively reduce the noise of the noise signal, so as to avoid the interference of the noise signal to the user.

As can be known from the above description, as compared to the prior art, this embodiment only needs to calculate or adjust one acoustic path without calculating the transfer function H1 and the transfer function H3 of two acoustic paths. That is, the purpose of active noise reduction can be achieved simply by calculating the transfer function H0 of the active noise reduction filter.

Figure 4:
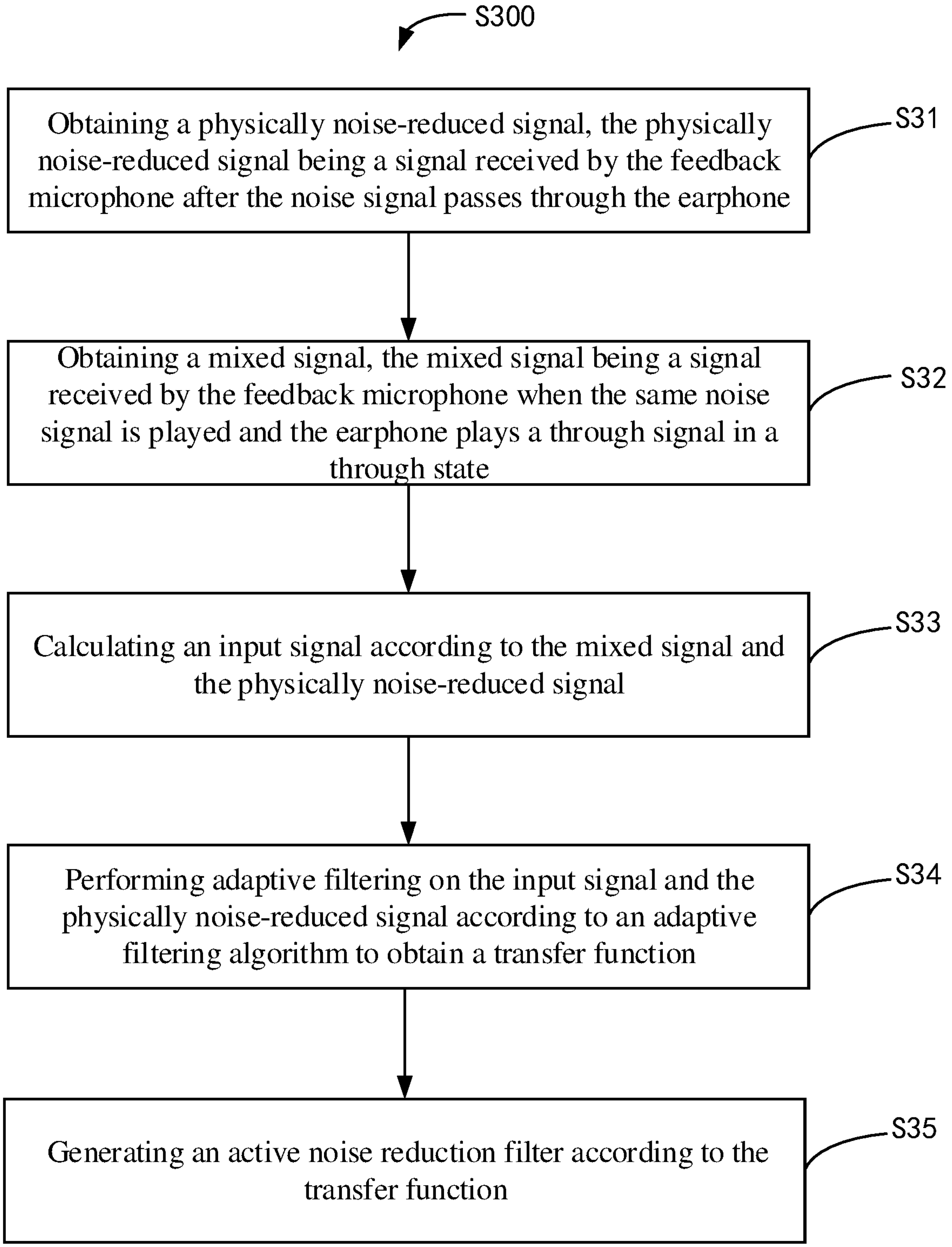
FIG. 4 is a schematic flowchart diagram of a method for generating an active noise reduction filter provided by an embodiment of the present disclosure.

As another aspect of the embodiment of the present disclosure, the embodiment of the present disclosure provides a method for generating an active noise reduction filter. Referring to FIG. 4, the method S300 for generating the active noise reduction filter includes:

S31: obtaining a physically noise-reduced signal, the physically noise-reduced signal being a signal received by the feedback microphone after a noise signal passes through the earphone;

S32: obtaining a mixed signal, the mixed signal being a signal received by the feedback microphone when the same noise signal is played and the earphone plays a through signal in a through state.

In some embodiments, the through signal is an audio signal played by the earphone in the through state, wherein the through signal may be a noise signal sampled by the feed-forward microphone. Because the noise signal sampled by the feed-forward microphone has the same transmission environment or medium as that of the physically noise-reduced signal, it is beneficial for calculating the optimal transfer function quickly and efficiently in the following steps. It shall be appreciated that the through signal may also be a randomly selected audio signal.

S33: calculating an input signal according to the mixed signal and the physically noise-reduced signal.

In some embodiments, the earphone may perform any appropriate processing on the mixed signal and the physically noise-reduced signal to obtain the input signal. In some embodiments, the earphone subtracts the physically noise-reduced signal from the mixed signal to obtain the input signal.

S34: performing adaptive filtering on the input signal and the physically noise-reduced signal according to an adaptive filtering algorithm to obtain a transfer function.

In some embodiments, the adaptive filtering algorithm includes the normalized least mean square algorithm, and S34 includes performing adaptively filtering on the input signal and the physically noise-reduced signal according to the normalized least mean square algorithm to obtain the transfer function. For example:

the vector form of weight update of the normalized least mean square algorithm is:

$$w(n+1)=w(n)+\mu(n)x(n)e(n)$$

wherein w(n) is the weight vector in the nth iteration, w(n+1) is the weight parameter vector updated on the basis of w(n), x(n) is the input vector in the nth iteration, and e(n) is the error between the reference output outputted by the active noise reduction filter and the physically noise-reduced signal in the nth iteration. μ(n) is the step-size factor, the value of μ affects the convergence speed and error of the active noise reduction filter. The step size in the normalized least mean square algorithm is an amount which varies with time, and it is defined as follows:

$$\mu(n)=\frac{\alpha}{\delta+\hat{P}_x(n)}$$

wherein $\hat{P}_x(n)$ is the estimated signal power at time n, $\hat{P}_x(n)=x^2(n)$, α is a modified step-size constant, $0<\alpha<2$, $\delta>0$ is a very small constant, the purpose of which is to avoid the situation where the denominator is zero when x(n)=0, and at the same time, to avoid the generation of a larger step size when the input signal power is too small. Here, the value is $\delta=0.00001$.

With reference to FIG. 3, the reference output y(n) is expressed as:

$$y(n)=x(n)gw(n)^T$$

wherein w(n) is the weight coefficient of the active noise reduction filter, the error signal between the reference output outputted by the active noise reduction filter and the physically noise-reduced signal is:

$$e(n)=d(n)-y(n)$$

In the optimal design of filters, some minimum cost function or some performance index is used to measure the quality of filters, and the most commonly used index is the mean square error, and this method of measuring the quality of filters is also called the mean square error criterion. The equation is presented as follows:

$$E\{e^2(n)\}=E\{[d(n)-y(n)]^2\}$$

wherein $E\{e^2(n)\}$ is the mean square error, d(n) represents the physically noise-reduced signal, y(n) represents the signal obtained after the input signal x(n) is processed by the active noise reduction filter, and e(n) represents the error between the reference output of the filter and the physically noise-reduced signal when x(n) is input. According to the above equation, the earphone looks for the optimal filter weight coefficient w(n), so that y(n) signal is infinitely close to d(n), and the error signal e(n) is infinitely close to 0, and the mean square error reaches the minimum value at this time.

Derivation is performed on the weight vector to get the gradient ∇(n) of mean square error:

$$\nabla(n)=\nabla E[e^2(n)]$$

In order to achieve the optimal performance of the filter designed based on the normalized minimum mean square error criterion, it is necessary to find out the minimum value on the error performance surface, and then the optimal filter parameters may be obtained. The error performance surface is searched along the tangent direction of the surface, that is, the negative gradient direction, and the filter weight coefficient w(n) is adjusted along the w(n) negative gradient direction. Let the filter tap weight vector obtained by the nth iteration be w(n), and let the mean square error obtained by this iteration be ε(n), then the filter coefficient obtained by the (n+1)th iteration may be obtained by the following equation:

$$w(n+1)=w(n)-\mu(n)\nabla(n)$$

wherein ∇(n) is the gradient vector of this iteration, −∇(n) is the direction vector of this iteration, and μ(n) is the step size used in the nth iteration, which is also called the convergence factor. It is very difficult to calculate the gradient ∇(n) accurately. A rough but very effective method for calculating ∇(n) is to directly take the error quadratic $e^2(n)$ as the estimated value of the mean square error $E\{e^2(n)\}$, i.e., $$\hat{\nabla}(n)=\nabla[e^2(n)]=2e(n)\nabla[e(n)]$$

wherein ∇[e(n)] is:

$$\nabla[e(n)]=\nabla[d(n)-y(n)]=\nabla\left[d(n)-x(n)w(n)^T\right]=-x(n)$$

then the mean square error estimated value is:

$$\hat{\nabla}(n)=-2e(n)x(n)$$

Therefore, the updating mode of tap parameters of the active noise reduction filter is as follows:

$$w(n+1)=w(n)+2\mu(n)e(n)x(n)$$

When the mean square error is the smallest, the optimal filter weight coefficient vector W is obtained, that is, the output signal vector Y=XW and the transfer function $$H2=\frac{Y}{X}=W.$$

Because the FIR filter is adopted, the filter parameters b=W and a=1 are obtained, so the transfer functions formed by the filter parameters a and b may be obtained.

S35: generating an active noise reduction filter according to the transfer function.

According to the above description, on the one hand, this embodiment can generate an active noise reduction filter according to the adaptive algorithm without accurately calculating the transfer functions of the physical acoustic path or the playing acoustic path, thereby achieving active noise reduction and improving the noise reduction efficiency. On the other hand, since there is no need to calculate the transfer functions of the physical acoustic path or the playing acoustic path, the calculation errors of the above two transfer functions are not introduced, thereby improving the noise reduction accuracy and the noise reduction effect.

Figure 5:
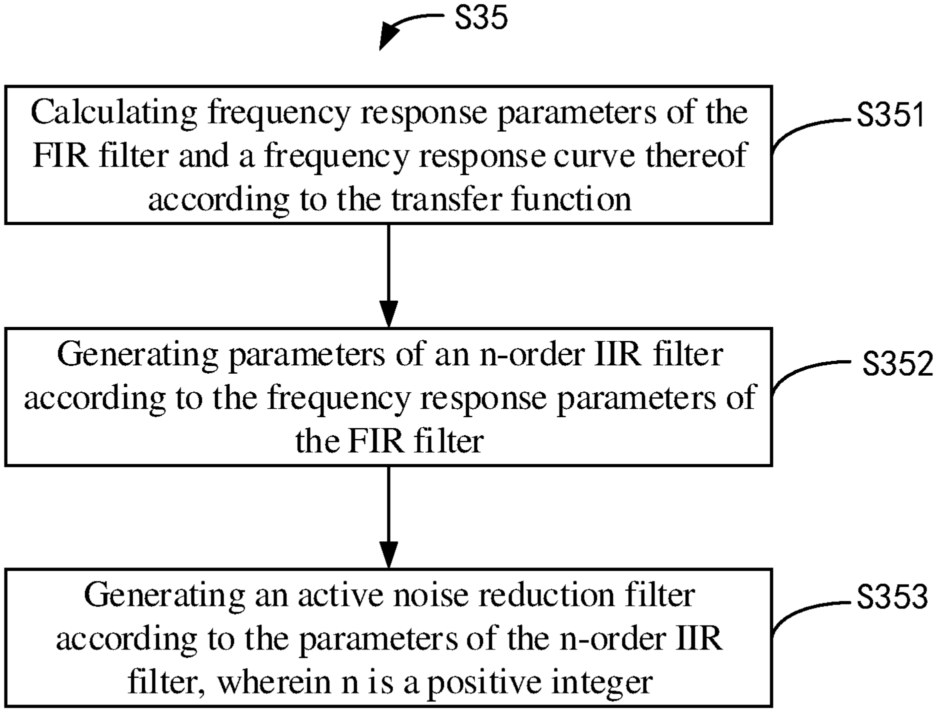
FIG. 5 is a schematic flowchart diagram of S35 shown in FIG. 4.

In some embodiments, referring to FIG. 5, S35 includes:

S351: calculating frequency response parameters of the FIR filter and a frequency response curve thereof according to the transfer function;

S352: generating parameters of an n-order IIR filter according to the frequency response parameters of the FIR filter;

S353: generating an active noise reduction filter according to the parameters of the n-order IIR filter, wherein n is a positive integer.

In step S351, in some embodiments, the earphone may calculate the frequency response parameters of the FIR filter according to the transfer function and in combination with the discrete Fourier transform algorithm, and draw the frequency response curve of the FIR filter according to the frequency response parameters of the FIR filter.

In step S352, in some embodiments, the earphone generates the parameters of the n-order IIR filter according to the frequency response parameters of the FIR filter and the filter order n that is set and in combination with the inverse discrete Fourier transform algorithm. The frequency response parameters include a h1 parameter and a w1 parameter. h1 contains the frequency responses of N frequency equal division points in the corresponding interval of a discrete system, wherein N is a positive integer. w1 is the value of N frequency equal division points. Then, according to h1 and w1, the desired IIR filter order n is set, and the inverse discrete Fourier transform is performed to obtain new IIR filter parameters b_new and a_new. That is, the parameters b_new and a_new of the IIR filter may form the n-order IIR filter.

In step S353, in some embodiments, the earphone calculates the frequency response parameters of the n-order IIR filter according to the parameters of the n-order IIR filter and in combination with the discrete Fourier transform algorithm, generates the frequency response curve of the n-order IIR filter according to the frequency response parameters of the n-order IIR filter, and performs order reduction on the parameters of the n-order IIR filter so as to change the parameters of the n-order IIR filter into parameters of the m-order IIR filter according to the frequency response curve of the n-order IIR filter, wherein m is a positive integer and 2<m<n, and generates an active noise reduction filter according to the parameters of the m-order IIR filter.

For example, in step S352, the parameters b_new and a_new of the n-order IIR filter may be obtained, and the frequency response parameters of the discrete system, which include h21 and w21, are obtained by discrete Fourier transform, and the frequency response curve is drawn. The order i of the IIR filter is designed to be less than n. According to the frequency response parameters and the filter order i that is set, the parameters of the i-order IIR filter are obtained by inverse discrete Fourier transform, and the parameters of the i-order IIR filter that are obtained are b_new21 and a_new21. According to the parameters b_new21 and a_new21 of the i-order IIR filter, the frequency response parameters h31 and w31 are obtained by the discrete Fourier transform, and the frequency response curve is drawn.

The frequency response curve of the i-order IIR filter is compared with the frequency response curve of the n-order IIR filter. If the similarity therebetween is less than or equal to the preset similarity threshold, then the value of i is increased to obtain a new i value, and then the above method is used to obtain the frequency response curve of a new i-order IIR filter.

The frequency response curve of the new i-order IIR filter is compared with the frequency response curve of the n-order IIR filter, and so on until the order of the IIR filter is reduced to m. If the similarity therebetween is greater than the preset similarity threshold, then the order reduction is successful, and whether i is equal to m is determined. If i is equal to m, i=m is recorded. If i is not equal to m, let n=i, and i is set to be the order desired by the user, and then the above method is used to obtain the frequency response curve of a new i-order IIR filter.

For example, the earphone generates the frequency response curve of a 512-order IIR filter according to the frequency response curve of the FIR filter. The earphone first sets i=64, and then obtains the frequency response curve of a 64-order IIR filter according to the above method.

The earphone compares the similarity between the frequency response curve of the 512-order IIR filter and the frequency response curve of the 64-order IIR filter, and if the similarity therebetween is less than or equal to the preset similarity threshold, then the order reduction fails. The reason for the failure is that the order difference between the 64-order IIR filter and the 512-order IIR filter is too big to represent the 512-order IIR filter with the 64-order IIR filter, so a fitted filter order is added.

Therefore, the 64-order is increased to 128-order, and the frequency response curve of the 128-order IIR filter is used to fit the frequency response curve of the 512-order IIR filter. If the similarity therebetween is greater than the preset similarity threshold, then the order reduction is successful.

For practical application, the 128-order IIR filter has larger consumption, so it is still difficult to be implemented. Therefore, it is necessary to repeat the above steps, and once again reduce the order of the 128-order IIR filter just obtained to 64-order, which is then reduced to 16-order, and so on.

In some embodiments, m=16. Because it is still difficult to implement the 16th-order IIR filter in engineering, it is necessary to convert the 16th-order IIR filter into a plurality of cascaded second-order IIR filters. In some embodiments, the earphone converts the transfer function corresponding to the parameters of the m-order IIR filter into a quadratic fractional model of a plurality of cascaded second-order IIR filters, and generates an active noise reduction filter according to the parameters of the plurality of second-order IIR filters. For example, the earphone converts the m-order IIR filter into a plurality of cascaded second-order IIR filters according to the function tf2sos, and generates an active noise reduction filter according to the parameters of the plurality of second-order IIR filters.

Figure 6:
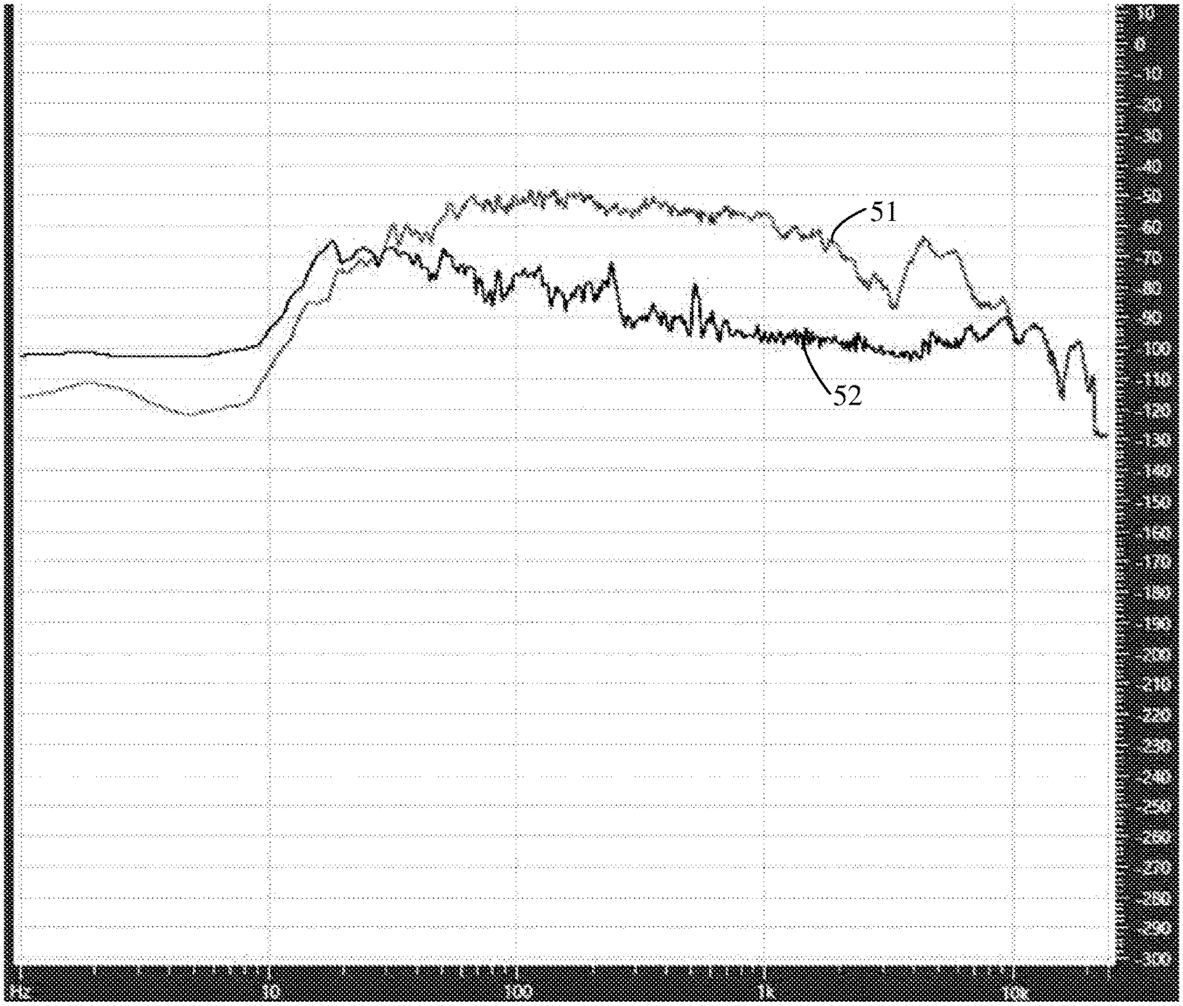
FIG. 6 is a schematic view illustrating the first effect of noise reduction using the active noise reduction filter shown in FIG. 4.
Figure 7:
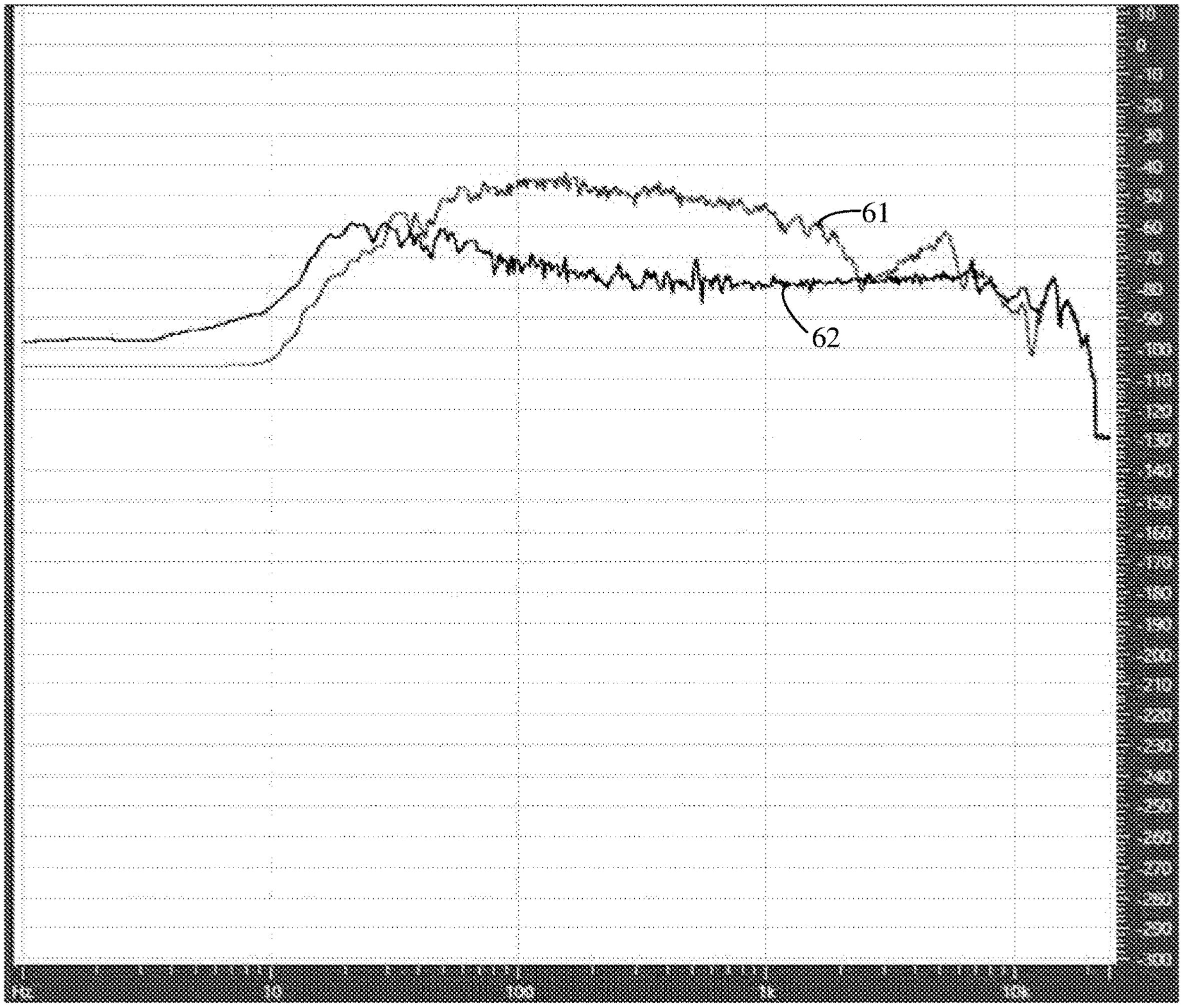
FIG. 7 is a schematic view illustrating the second effect of noise reduction using the active noise reduction filter shown in FIG. 4.

In order to show the noise reduction effect of the active noise reduction filter provided in this embodiment, description is made herein with reference to FIG. 6 and FIG. 7 respectively. In FIG. 6, a first curve 51 represents the external noise received by an artificial ear after physical noise reduction, and a second curve 52 represents the residual noise received by the feedback microphone under the action of the active noise reduction filter. In FIG. 7, a third curve 61 represents the external noise received by the artificial ear after physical noise reduction, and a fourth curve 62 represents the residual noise received by the feedback microphone under the action of the active noise reduction filter.

The performance indicators of the active noise reduction earphone generally include noise reduction bandwidth and noise reduction depth, and the noise reduction bandwidth refers to the range of noise frequencies which may be processed by the earphone. Different kinds of sounds have different frequencies. Therefore, when the noise reduction bandwidth is larger, it will cover more frequencies, and the earphone can perform noise reduction on more kinds of sounds. The noise reduction depth refers to how much the volume may be reduced for the noise of a certain frequency. The larger the value is, the better the noise reduction effect will be. Generally, the maximum value of the noise reduction depth is used as the noise reduction depth of the whole earphone. The noise reduction bandwidth indicates the types of sound that may be processed, and the effect of noise reduction after actual processing is determined by the noise reduction depth at the frequency. As can be known from FIG. 6 and FIG. 7, the noise reduction bandwidth is between 50 hz and 5 khz as well as 50 hz and 10 khz respectively, and the noise reduction depth is roughly within the range of 20 dB to 35 dB. The active noise reduction algorithm has considerable noise reduction bandwidth and noise reduction depth, and has certain practical value.

It should be noted that, in each of the above embodiments, the above steps are not necessarily executed in a certain order. According to the description of the embodiments of the present disclosure, those of ordinary skill in the art may understand that in different embodiments, the above steps may be executed in different orders. That is, these steps may be executed in parallel or the steps may be exchanged for execution, and so on.

Figure 8:
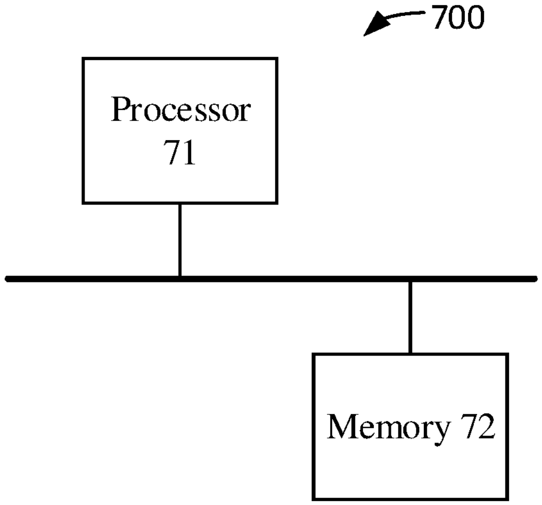
FIG. 8 is a schematic view of a circuit structure of an earphone provided according to an embodiment of the present disclosure.

Please refer to FIG. 8, which is a schematic view of a circuit structure of an earphone provided according to an embodiment of the present disclosure. As shown in FIG. 8, an earphone 700 includes one or more processors 71 and a memory 72. In FIG. 8, one processor 71 is taken as an example.

The processor 71 and the memory 72 may be connected by a bus or other means, and the connection achieved by a bus is taken as an example in FIG. 8.

As a nonvolatile computer readable storage medium, the memory 72 may be used to store nonvolatile software programs, nonvolatile computer executable programs and modules, such as program instructions/modules corresponding to the method for generating the active noise reduction filter in the embodiment of the present disclosure. The processor 71 achieves the functions of the method for generating the active noise reduction filter provided according to the above embodiments of the method by running nonvolatile software programs, instructions and modules stored in the memory 72.

The memory 72 may include a high-speed random access memory, and may also include a nonvolatile memory, such as at least one magnetic disk memory device, flash memory device, or other nonvolatile solid-state memory device. In some embodiments, the memory 72 optionally includes memories remotely located relative to the processor 71, and these remote memories may be connected to the processor 71 through a network. Examples of the above network include but are not limited to the Internet, Intranet, local area networks, mobile communication networks and combinations thereof.

The program instructions/modules are stored in the memory 72, and when executed by the one or more processors 71, execute the method for generating the active noise reduction filter in any of the above embodiments of the method.

An embodiment of the present disclosure further provides a storage medium, in which computer executable instructions are stored. The computer executable instructions, when executed by one or more processors, e.g., a processor 71 in FIG. 8, may cause the one or more processors to execute the method for generating the active noise reduction filter in any of the above embodiments of the method.

An embodiment of the present disclosure further provides a computer program product, which includes a computer program stored on a nonvolatile computer readable storage medium, and the computer program includes program instructions. The program instructions, when executed by the earphone, cause the earphone to execute any of the methods for generating the active noise reduction filter.

The embodiments of the above-described devices or equipments are only schematic. The unit modules described as separate components may or may not be physically separated, and components displayed as module units may or may not be physical units, that is, they may be located in one place or distributed over multiple network module units. Some or all of the modules may be selected according to actual needs to achieve the purpose of this embodiment.

From the description of the above embodiments, those skilled in the art may clearly understand that each embodiment may be realized by means of software plus a general hardware platform, and of course, it may also be realized by hardware. Based on such understanding, the essence of the above technical solution or the part that contributes to related technologies may be embodied in the form of software products. The computer software products may be stored in computer-readable storage media, such as a ROM/RAM, a magnetic disk, an optical disk or the like, and they include several instructions to make a computer equipment (which may be a personal computer, a server, or a network equipment, etc.) execute the method described in various embodiments or some parts of embodiments.

Finally, it shall be noted that, the above embodiments are only used to illustrate the technical solution of the present disclosure, but not to limit the present disclosure. Under the concept of the present disclosure, technical features in the above embodiments or different embodiments may also be combined, the steps may be realized in any order, and many other variations in different aspects of the present disclosure as described above are possible, and these variations are not provided in details for conciseness. Although the present disclosure has been described in detail with reference to the foregoing embodiments, those of ordinary skill in the art shall appreciate that, the technical solutions described in the foregoing embodiments may still be modified or some of the technical features may be equivalently replaced. These modifications or substitutions do not make the essence of the corresponding technical solutions deviate from the scope of the technical solutions of various embodiment of the present disclosure.

What is claimed is:

1. A method for generating an active noise reduction filter, comprising:

obtaining a physically noise-reduced signal, the physically noise-reduced signal being a signal received by a feedback microphone after a noise signal passes through an earphone;

obtaining a mixed signal, the mixed signal being a signal received by the feedback microphone when the same noise signal is played and the earphone plays a through signal in a through state;

calculating an input signal according to the mixed signal and the physically noise-reduced signal;

performing adaptive filtering on the input signal and the physically noise-reduced signal according to an adaptive filtering algorithm to obtain a transfer function; and generating an active noise reduction filter according to the transfer function.

2. The method of claim 1, wherein the generating an active noise reduction filter according to the transfer function comprises:

calculating frequency response parameters of an FIR filter and a frequency response curve thereof according to the transfer function;

generating parameters of an n-order IIR filter according to the frequency response parameters of the FIR filter; and generating an active noise reduction filter according to the parameters of the n-order IIR filter, wherein n is a positive integer.

3. The method of claim 2, wherein the generating parameters of an n-order IIR filter according to the frequency response parameters of the FIR filter comprises:

generating the parameters of the n-order IIR filter according to the frequency response parameters of the FIR filter and the filter order n that is set and in combination with an inverse discrete Fourier transform algorithm.

4. The method of claim 3, wherein the frequency response parameters comprise parameters h and parameters w, the generating the parameters of the n-order IIR filter according to the frequency response parameters of the FIR filter and the filter order n that is set and in combination with the inverse discrete Fourier transform algorithm comprises:

obtaining parameters b and a of the IIR filter according to the parameters h and parameters w of the FIR filter and the filter order n that is set and in combination with the inverse discrete Fourier transform algorithm, wherein the parameters b and a of the IIR filter can form the n-order IIR filter.

5. The method of claim 2, wherein the generating an active noise reduction filter according to the parameters of the n-order IIR filter comprises:

calculating the frequency response parameters of the n-order IIR filter according to the parameters of the n-order IIR filter and in combination with the discrete Fourier transform algorithm;

generating a frequency response curve of the n-order IIR filter according to the frequency response parameters of the n-order IIR filter;

performing order reduction on the parameters of the n-order IIR filter so as to change the parameters of the n-order IIR filter into parameters of the m-order IIR filter according to the frequency response curve of the n-order IIR filter, wherein m is a positive integer and $2<m<n$; and generating an active noise reduction filter according to the parameters of the m-order IIR filter.

6. The method of claim 5, wherein the generating an active noise reduction filter according to the parameters of the m-order IIR filter comprises:

converting the transfer function corresponding to the parameters of the m-order IIR filter into a quadratic fractional model of a plurality of cascaded second-order IIR filters; and generating an active noise reduction filter according to the parameters of the plurality of second-order IIR filters.

7. The method of claim 6, wherein the m is 16.

8. The method of claim 2, wherein the calculating frequency response parameters of an FIR filter and a frequency response curve thereof according to the transfer function comprises:

calculating frequency response parameters of an FIR filter according to the transfer function and in combination with a discrete Fourier transform algorithm.

9. The method of claim 1, wherein the through signal is a noise signal sampled by a feed-forward microphone.

10. The method of claim 1, wherein the calculating an input signal according to the mixed signal and the physically noise-reduced signal comprises:

obtaining the input signal by subtracting the physically noise-reduced signal from the mixed signal.

11. The method of claim 1, wherein the adaptive filtering algorithm comprises a normalized least mean square algorithm, and the performing adaptive filtering on the input signal and the physically noise-reduced signal according to an adaptive filtering algorithm to obtain a transfer function comprises:

performing adaptive filtering on the input signal and the physically noise-reduced signal according to the normalized least mean square algorithm to obtain the transfer function.

12. The method of claim 11, wherein the performing adaptive filtering on the input signal and the physically noise-reduced signal according to the normalized least mean square algorithm to obtain the transfer function comprises:

obtaining a reference output according to the input signal and in combination with the adaptive filtering algorithm;

subtracting the physically noise-reduced signal from the reference output to obtain an error;

feeding back to an adaptive filtering algorithm module so as to the adaptive filtering algorithm module adjusts the transfer function of the active noise reduction acoustic path until the error is close to or equal to 0; and recording the final transfer function.

13. The method of claim 1, wherein the earphone comprises a feed-forward microphone, the method further comprises:

starting the active noise reduction function of the active noise reduction filter when the noise signal is sampled by the feed-forward microphone.

14. The method of claim 1, wherein the earphone comprises a feed-forward microphone, the method further comprises:

turning off the active noise reduction function of the active noise reduction filter when no noise signal is sampled by the feed-forward microphone.

15. The method of claim 1, wherein the earphone comprises a speaker, when the active noise reduction function of the active noise reduction filter is turned off, the through signal is directly transmitted to the outside through the speaker without the active noise reduction processing of the active noise reduction filter.

16. The method of claim 1, wherein the earphone comprises a speaker, when the active noise reduction function of the active noise reduction filter is started, the through signal is subjected to active noise reduction by the active noise reduction filter to obtain an active noise reduction signal, and the active noise reduction signal is transmitted to the outside through the speaker.

17. The method of claim 1, wherein the earphone comprises a housing, the method further comprises:

suspending the operation of the active noise reduction filter, wherein a physically noise-reduced signal is obtained after the noise signal passes through the first acoustic path, the first acoustic path is the acoustic path in which the noise signal is transmitted to the feedback microphone after passing through the housing.

18. The method of claim 1, further comprising:

setting the working state of the active noise reduction filter to the through state; and controlling the noise source to play the same noise signal.

19. A non-transitory storage medium storing computer executable instructions, the computer executable instructions being configured to cause an electronic equipment to execute the method for generating the active noise reduction filter of claim 1.

20. An earphone, comprising a housing, a feed-forward microphone, an active noise reduction filter, a speaker, a feedback microphone and a controller, all of the feed-forward microphone, the active noise reduction filter, the speaker, the feedback microphone and the controller being mounted on the housing, wherein the controller comprises:

at least one processor; and a memory communicatively connected with the at least one processor; wherein the memory stores instructions executable by the at least one processor, and the instructions are executed by the at least one processor to enable the at least one processor to execute the method for generating the active noise reduction filter of claim 1.

* * * * *